United States Patent
Gacanin

(10) Patent No.: US 9,526,019 B2
(45) Date of Patent: Dec. 20, 2016

(54) METHOD AND SYSTEM FOR DIAGNOSTICS AND TROUBLESHOOTING IN HOME NETWORK DEPLOYMENTS

(71) Applicant: Alcatel Lucent, Boulogne-Billancourt (FR)

(72) Inventor: Haris Gacanin, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 20 days.

(21) Appl. No.: 14/377,672

(22) PCT Filed: Mar. 11, 2013

(86) PCT No.: PCT/EP2013/054865
§ 371 (c)(1),
(2) Date: Aug. 8, 2014

(87) PCT Pub. No.: WO2013/135624
PCT Pub. Date: Sep. 19, 2013

(65) Prior Publication Data
US 2015/0009846 A1    Jan. 8, 2015

(30) Foreign Application Priority Data
Mar. 15, 2012 (EP) .................................. 12305303

(51) Int. Cl.
*H04W 24/08* (2009.01)
*H04B 17/00* (2015.01)
(Continued)

(52) U.S. Cl.
CPC .......... *H04W 24/08* (2013.01); *G06F 11/0751* (2013.01); *G06F 11/1004* (2013.01);
(Continued)

(58) Field of Classification Search
CPC ............. H04L 12/2413; H04L 12/2464; H04L 12/2489; H04L 41/18; H04L 41/50; H04L 41/5061; H04L 41/507; H04L 41/509; H04L 43/065; H04L 12/2803; H04L 29/08099; H04W 24/08
See application file for complete search history.

(56) References Cited

U.S. PATENT DOCUMENTS

2006/0098725 A1*  5/2006  Rhee et al. ................... 375/222
2008/0205501 A1   8/2008  Cioffi et al.
(Continued)

FOREIGN PATENT DOCUMENTS

CN      1996906 A      7/2007
CN    101133632 A      2/2008
(Continued)

OTHER PUBLICATIONS

"PowerLine Telecommunications (PLT); Quality of Service (QoS) Requirements for In-house Systems; ETSI TR 102 49," IEEE, vol. PLT, No. V1.1.1, May 1, 2002.
(Continued)

*Primary Examiner* — Benjamin H Elliott, IV
(74) *Attorney, Agent, or Firm* — Harness, Dickey & Pierce, P.L.C.

(57) ABSTRACT

Method for analysing at a remote server a problem of a home network, at the remote server which is connected through the internet with the home network, includes storing reference data of at least one home network performance parameter covering a frequency band, the reference data corresponding with a normal behaviour of the home network; obtaining, through the internet, measurement data of the at least one home network performance parameter covering the fre- (Continued)

quency band; comparing the measurement data with the reference data to determine qualification data qualifying the problem.

11 Claims, 5 Drawing Sheets

(51) Int. Cl.
  H04L 12/28 (2006.01)
  H04M 3/00 (2006.01)
  H04M 3/30 (2006.01)
  H04L 12/26 (2006.01)
  H04L 12/24 (2006.01)
  G06F 11/07 (2006.01)
  G06F 11/10 (2006.01)
  H04B 17/309 (2015.01)

(52) U.S. Cl.
  CPC ........... *H04B 17/00* (2013.01); *H04B 17/309* (2015.01); *H04L 12/2825* (2013.01); *H04L 41/06* (2013.01); *H04L 43/16* (2013.01); *H04M 3/00* (2013.01); *H04M 3/305* (2013.01); *H04M 3/306* (2013.01)

(56) References Cited

U.S. PATENT DOCUMENTS

| | | | |
|---|---|---|---|
| 2009/0100492 A1* | 4/2009 | Hicks et al. | 725/127 |
| 2010/0103941 A1* | 4/2010 | Jiang et al. | 370/400 |
| 2014/0321298 A1* | 10/2014 | Chow et al. | 370/252 |
| 2015/0009846 A1* | 1/2015 | Gacanin | 370/252 |

FOREIGN PATENT DOCUMENTS

| | | |
|---|---|---|
| CN | 101365145 A | 2/2009 |
| CN | 101938387 A | 1/2011 |
| JP | 2007513556 A | 5/2007 |
| KR | 1020070074157 | 7/2007 |
| KR | 100976443 B1 | 8/2010 |
| WO | WO-2005057857 A2 | 6/2005 |
| WO | WO-2007008835 A2 | 1/2007 |

OTHER PUBLICATIONS

European Communication pursuant to Article 94(3) EPC dated Dec. 15, 2015, issued in European Application No. 12 305 303.5.

FTTx Access Networks and Services Quality Assurance and Testing Methodologies, 1-20 pages, Feb. 2010.

International Search Report PCT/ISA/210 for International Application No. PCT/EP2013/054865 Dated May 6, 2013.

Written Opinion of the International Searching Authority PCT/ISA/237 for International Application No. PCT/EP2013/054865 Dated May 6, 2013.

* cited by examiner

METHOD AND SYSTEM FOR DIAGNOSTICS AND TROUBLESHOOTING IN HOME NETWORK DEPLOYMENTS

TECHNICAL FIELD

The invention relates to the field of diagnostics and troubleshooting in home network deployments. More in particular, the invention relates to a method and a system for analyzing at a remote server a problem of a home network.

BACKGROUND

If a failure occurs within the home network, currently, only manual troubleshooting by service operator technicians or the customers themselves exists. This type of troubleshooting is typically a reaction to complaints of the customer. A complaint triggers the dispatch of technicians to investigate the problem. Such a procedure is time consuming and highly costly.

SUMMARY

The object of embodiments of the present invention is to provide a method and a system allowing a more pro-active diagnostics and troubleshooting approach for problems occurring in the home network.

According to an embodiment of the invention, there is provided a method for analyzing at a remote server, a problem of a home network. The method comprises the following steps performed at a remote server which is connected through the internet with the home network. First, reference data of at least one home network performance parameter covering a frequency band, are stored. Those reference data correspond with a normal behaviour of the home network, and may e.g. be obtained during a pre-configuration step. In a next step, measurement data of the at least one home network performance parameter covering the frequency band, are obtained through the Internet, preferably using an application layer remote management protocol. Next, the measurement data are compared with the reference data to determine qualification data qualifying the problem.

Using such a method, a problem can be detected and analyzed remotely, based on measurement data which are also obtained remotely. Embodiments of such a method can provide a proactive automatic troubleshooting method, allowing to detect problems even before a customer complains.

According to a preferred embodiment, the method may be specifically adapted for use with a series of home communication devices/technologies. In that way, account can be taken of the most common home communication devices/technologies. For those home communication devices/technologies one or more relevant frequency bands are determined, i.e. the frequency bands in which more than one home communication device may operate. The reference data and the measurement data are then stored/obtained for a frequency band which covers those one or more relevant bands. The determining of qualifying data may comprise determining an affected frequency band of the measurement data in which the measurement data differs from the reference data by at least a predetermined threshold. The method may further comprise recommending a solution to the problem based on the qualification data, and may in particular comprise indicating a device of the series of home communication devices based on the affected frequency band, as the device that causes an interference problem.

According to a preferred embodiment, the measurement data are obtained using an application layer protocol for remote management, e.g. the TR-069 protocol. TR-181 discloses a device data model for TR-069, see http://www-.broadband-forum.org/technical/download/TR-181 Issue-2.pdf. This document is included herein by reference. See also the data model definition which can be found on http://www.broadband-forum.org/cwmp/tr-181-2-4-0.html and which discloses in the section "device.upa.diagnostics" that it can be indicated to carry out port management tests in order to obtain network measurement data of network parameters such as the channel frequency response (CFR) and the signal-to-noise ratio (SNR). This disclosure is also incorporated by reference.

According to a preferred embodiment, the home network is connected to the Internet through a home gateway, and the network measurements are obtained through the home gateway. The home gateway is typically a TR-069 enabled device adapted to obtain the measurement data of the at least one home network performance parameter. Note however that the remote server may also communicate directly with a communication device of the home network instead of with the home gateway.

The home network performance parameter is typically a parameter of the physical layer of the home network.

According to a preferred embodiment, the at least one home network performance parameter comprises at least one of the following, preferably in the form of a frequency dependent vector: channel frequency response (CFR), signal-to-noise ratio (SNR), bit error rate (BER), cyclic redundancy check (CRC), retransmission counter, a noise level. Depending on the type of information needed by the service operator, one or more of said home network performance parameters may be measured on request of the remote server. According to exemplary embodiments, the CFR parameter may be used on its own, or in combination with a noise parameter, such as SNR. Also, the CFR parameter may be combined with BER and/or CRC and/or retransmission counter parameters. Alternatively, the CFR parameter may be combined with a bit-allocation mapping parameter.

According to a preferred embodiment, the obtaining of measurement data comprises obtaining a plurality of vectors for a home network performance parameter. Each vector comprises values for a series of different frequencies.

According to another aspect of the invention, there is provided a system adapted for analyzing remotely a problem of a home network. The system comprises a data storage storing reference data of at least one home network performance parameter covering a frequency band, which reference data corresponds with a normal behaviour of the home network. The system further comprises at the remote server, a data collector adapted for requesting and receiving through the Internet, measurement data of the at least one home network performance parameter covering the frequency band. Further, there is provided a processor adapted for comparing the measurement data with the reference data to determine qualification data qualifying the problem.

The data collector is preferably adapted to communicate through a remote management application layer protocol, such as the TR-069 protocol to request and received the measurement data.

Further, the system may comprise a recommending means, adapted to recommend a solution to the problem based on the qualification data.

According to a preferred embodiment, the system is adapted for use with home networks which comprise one or more of a predefined series of home communication devices. For that predefined series of home communication devices, one or more relevant frequency bands are determined. Those relevant frequency bands typically correspond with frequency bands in which more than one home communication device of the series of home communication devices operates. In this embodiment, the date storage stores reference data for a frequency band covering at least the one or more relevant bands, and the data collector is adapted to request and receive measurement data covering at least the one or more relevant bands. The processor is then preferably adapted to determine qualifying data by determining an affected frequency band of the measurement data in which the measurement data differ from the reference data by at least a predetermined threshold. The recommending means may be adapted to recommend a solution by indicating a device of the series of home communication devices based on the affected frequency band, as the device that causes an interference problem.

The system may comprise a TR-069 enabled home gateway adapted to receive a request for the measurement data of the at least one home network performance parameter, to obtain the measurement data, and to send the measurement data to the data collector through the internet. According to possible embodiments, the system may further comprise a plurality of home networks using any one of the following technologies: G.hn, HomePlug, UPA, HomeGrid. The home network may comprise e.g. coax lines and/or phone lines and/or power lines. A typical example of a home communication device is power line adaptor.

The data collector is preferably a TR-069 enabled device. Such a device will allow collecting measurement data of the home networks through the internet by sending a suitable TR-069 request message. Preferably, the data collector is adapted to collect at least one of the following, preferably in the form of a frequency dependent vector: channel frequency response (CFR), signal-to-noise ration (SNR), bit error rate (BER), cyclic redundancy check (CRC), retransmission counter, a noise level.

BRIEF DESCRIPTION OF THE FIGURES

The accompanying drawings are used to illustrate presently preferred non limiting exemplary embodiments of methods, servers and systems of the present invention. The above and other advantages of the features and objects of the invention will become more apparent and the invention will be better understood from the following detailed description when read in conjunction with the accompanying drawings, in which.

DETAILED DESCRIPTION

Figure 1:
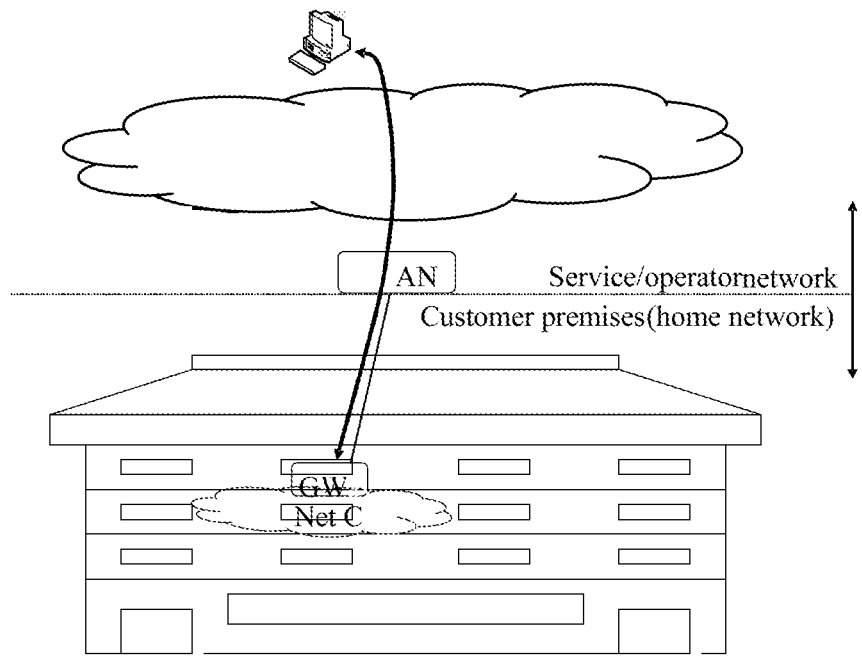
FIG. 1 illustrates schematically a first embodiment of a system of the invention.

A first embodiment of the system of the invention is illustrated in FIG. 1. The network architecture comprises a remote server 1 which is connected through the internet 6 and through an access node 2 with a home network 3. In the home network 3, different frequency bands may be used for different technologies used in the home network. Currently, different standards are available to enable broadband data communication required by in-house high data rate applications over power line cables. The most relevant technologies today are HomePlug and International Telecommunication Union (ITU), G.hn standards, but there are still some products based on former UPA association (now HomeGrid). Due to different standardisations and specifications those technologies utilise different frequency bands. Consequently, a problem may arise when adaptors based on different technologies are working within the same network or in nearby areas in their respective frequency bands. Interference in overlapping bands may cause significant problems and should preferably be detected remotely and dealt with timely.

Now embodiments of the invention will be illustrated referring to specific examples of technologies used in the home network, but the skilled person will understand that the invention is also applicable for other existing or future technologies operating in similar or different frequency ranges. In the G.hn standard, 50 MHz and 100 MHz bands are available for coax, phone and power lines. In the HomePlug specification, depending on the standard generation (e.g. HomePlug 1 or HomePlug AV or HomePlug AV2, etc.) different frequency bands, such as 30 MHz and 100 MHz bands are also utilized by HomePlug technology. For UPA devices a band of 30 MHz may be used for power line communication. In view of those frequency ranges, it is understood that interference may arise if adaptors operate nearby each other.

A basic idea of embodiments of the invention is to propose a method and system for home network multiple technology detection and troubleshooting of interfering devices and/or for identifying possible disturbers of a home network. In particular, embodiments of the invention are valuable for diagnostics and troubleshooting of interference problems related to G.hn/HomePlug/UPA/HomeGrid home networking deployments.

In the exemplary embodiments illustrated below, a power line communication home network deployment is considered, but the skilled person understands that the invention is equally applicable when using other communication lines, such as coax and phone lines.

In the embodiment of FIG. 1, the remote server 1 is first used to initiate the measurement of different home network performance parameters over a residential gateway 4, see arrow 5. The residential gateway 4 communicates with the home network devices and provides the network performance parameter data to the remote server 1 upon request. The obtained measurement data for the home network performance parameters are used to estimate alien interference. In the example of power line adaptors, e.g. the following network performance parameters of the physical layer of the home network may be obtained:

a channel frequency response (CFR) in the form of an average attenuation or in the form of a frequency-dependent vector;

signal-to-noise ratio (SNR) in the form of an average attenuation or frequency-dependent vector;

bit error rate (BER) or other CRC or retransmission counters, in the form of a table;

noise level in the form of an average attenuation or frequency-dependent vector;

bit-allocation mapping, in the form of a table.

Figure 3A:
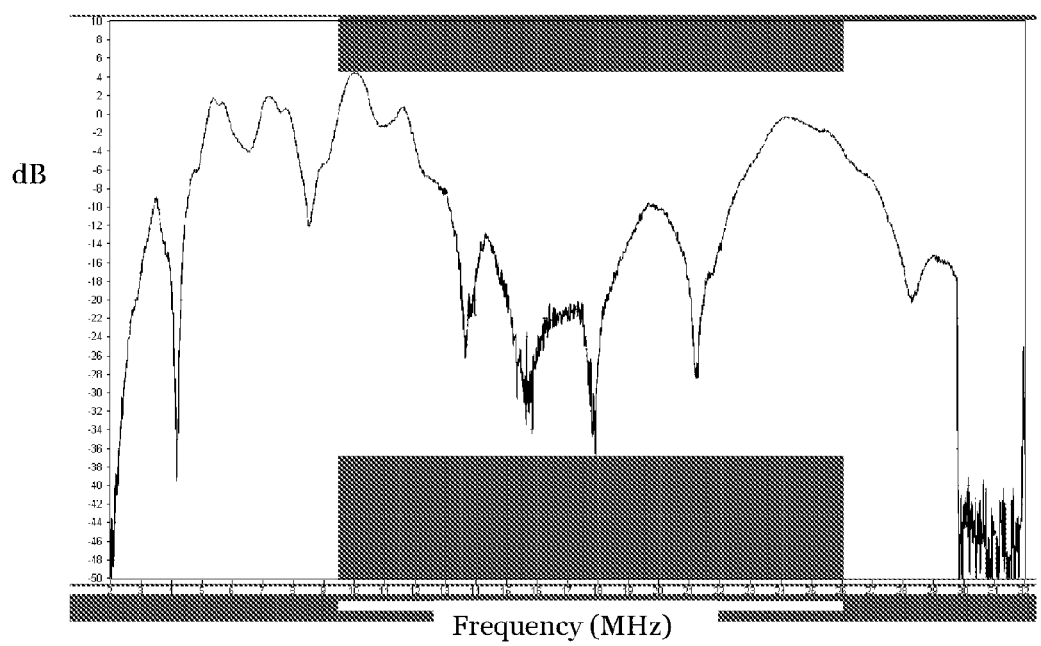
FIGS. 3A and 3B illustrate respectively the connected CFR and power line noise for the embodiment of FIG. 1.
Figure 3B:
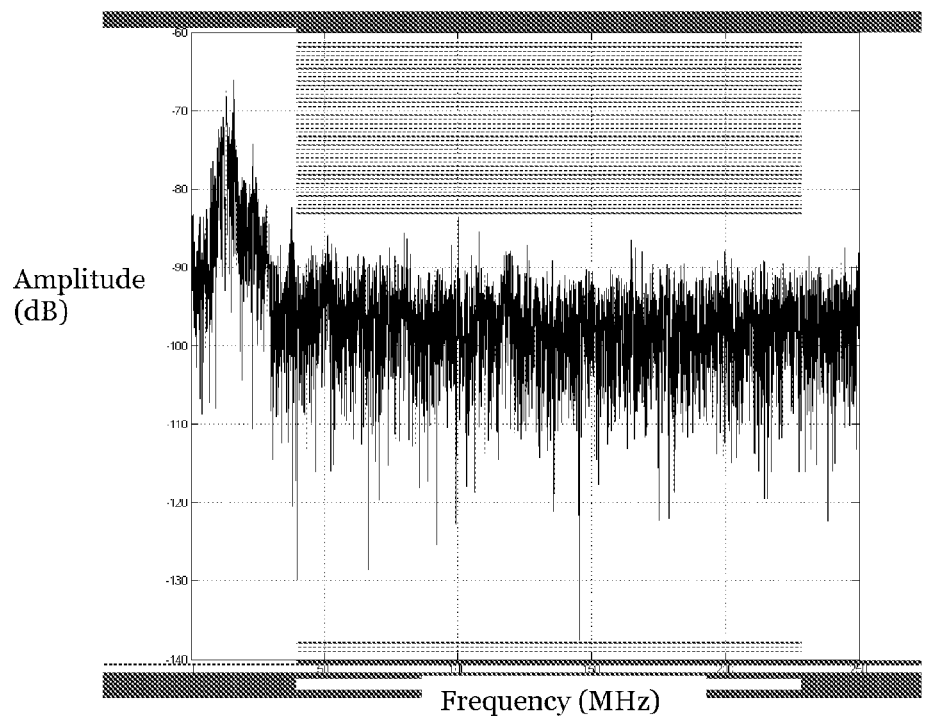

FIGS. 3A and 3B illustrate respectively an example where a CFR vector and a power line noise vector is obtained from a power line adaptor in the home network.

Figure 4:
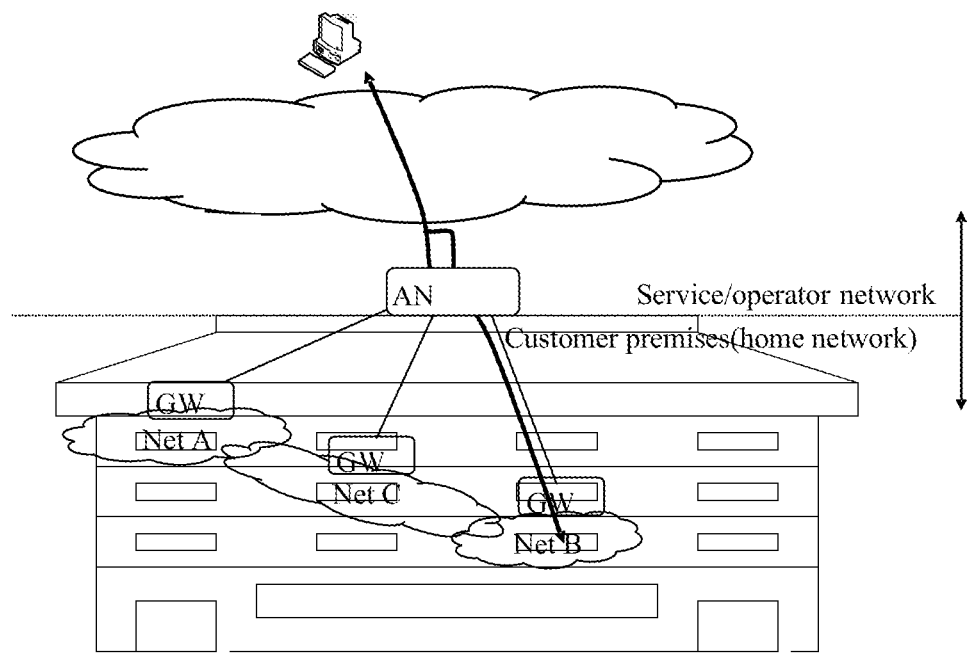
FIG. 4 illustrates schematically a second embodiment of a system of the invention.

Now it will be assumed that the home network contains a plurality of power line adaptors, wherein one adaptor of the power line adaptors is operating based on the HomePlug specification, while the other power line adaptors are operating based on a G.hn standard specification. In this example, the different power line adaptors may be included in the same home network 3, as illustrated in FIG. 1, or may be included in different neighbouring home networks 3 as illustrated in FIG. 4. In the example of FIG. 4, e.g. Net C may comprise a HomePlug adaptor, whilst Nets A and B may comprise a G.hn adaptor. Note that in the example of FIG. 1, where it is assumed that different adaptors are located within the same power line network (Net C), the problems may be more severe.

Figure 2:
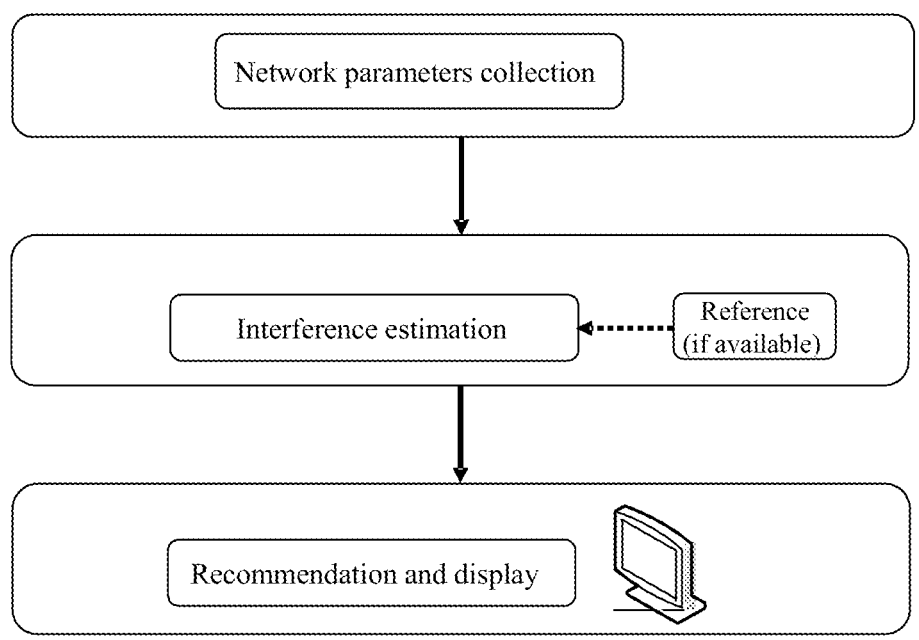
FIG. 2 is a flow chart illustrating an embodiment of the method of the invention.

Now an embodiment of the method of the invention will be illustrated referring to FIG. 2. In a first stage 21, measurement data of at least one home network performance parameter are collected from the network devices by using an application layer protocol for remote management, such as the TR-069 protocol. Examples of home network performance parameters that may be collected are listed above. In the present example, we will first consider that the CFR parameter as frequency-dependent vector was measured and collected by the remote server.

Figures 5A, 5B:
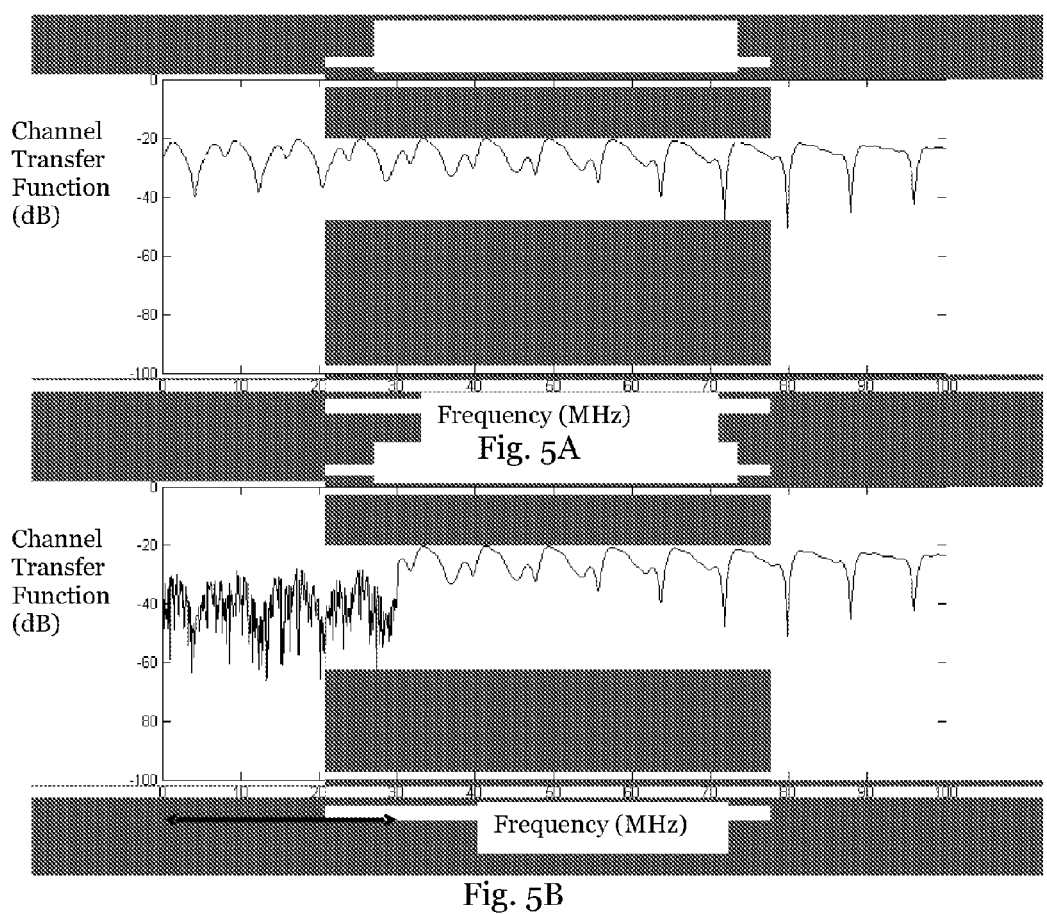
FIGS. 5A and 5B illustrate schematically an example a CFR with and without interference.

In the second stage 22, the alien interference is estimated based on the collected measurement data. In the example where the CFR parameter was measured, the frequency-dependent CFR vector may be segmented in order to focus on the relevant frequency bands, i.e. on the overlapping areas of the frequency bands of different technologies. E.g., the 30 MHz band is used both in HomePlug and G.hn devices, so that interference may arise in this band. This is illustrated in FIGS. 5A and 5B which show respectively the CFR parameter with and without interference for the 100 MHz frequency band. FIG. 5B shows that the interference occurs in the 30 MHz frequency band. In the example of FIGS. 5A and 5B the impact of noise is not taken into the consideration for the sake of simplicity. However, the skilled person will understand that noise may be taken into consideration.

Now an example will be described of an algorithm that may be used to determine qualification data qualifying the interference problem using the measured CFR data. The algorithm is based on a comparison of the measured CFR with a reference CFR stored in a database. For each frequency an average power level of the measured CFR may be calculated and compared with a reference power level. This is repeated for each frequency to detect an affected frequency band AB. According to a possible implementation, the standard deviation between the measured signal and the reference signal may be calculated for each frequency. If the entire available band is affected more than a predefined threshold, it is determined that the interference is not only due to an alien power line system, and the method proceeds to stage 23. If a part of the entire available band is having a relatively high standard deviation, it is determined that interference is detected, and the method goes to stage 23.

Figure 6A:
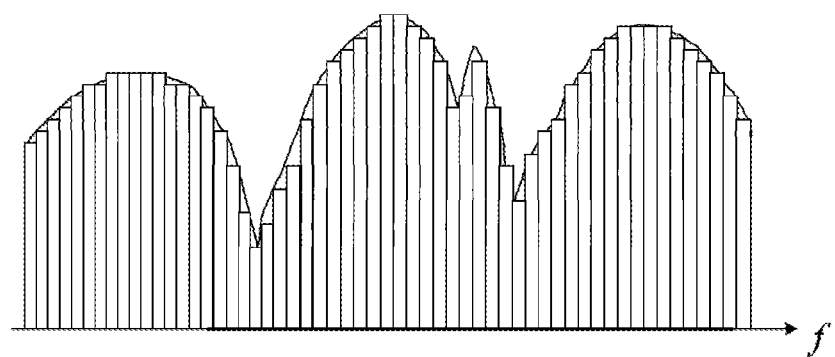
FIGS. 6A and 6B illustrate schematically a graph showing the number of bits allocated per subcarrier for a normal bit loading process (without interference) and for an effective bit loading process (with interference), respectively.
Figure 6B:
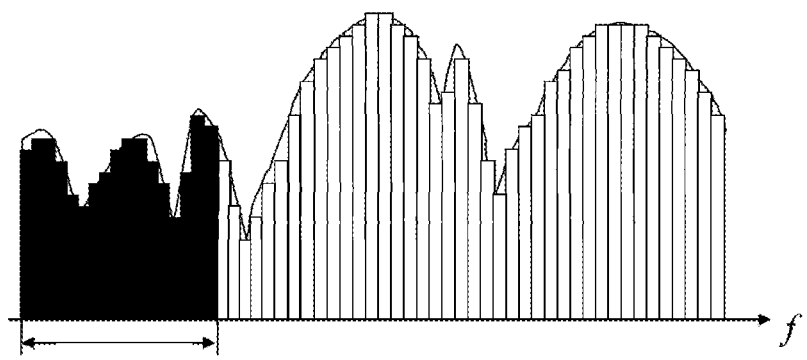

In the example above, the interference estimation of stage 22 was done based on the CFR vector. Now another example will be given where the interference estimation is based on a measured bit-allocation mapping parameter. Each technology used in the home network is using a bit-allocation algorithm which allocates the bits to each subcarrier used in the system. Bit-allocation tables are held in the memory of the system and used for re-synchronization if necessary. By collecting measurement data of the bit-allocation mapping parameter in the home network, interference may be detected as follows. For each subcarrier in the relevant frequency band, the modulation level of the "new" measured bit-allocation table is compared with an "old" reference bit-allocation table. This is illustrated in FIGS. 6A and 6B.

If the new measured level for a particular subcarrier is affected by more than a predefined threshold compared to the old reference level of the bit-allocation table, than it is determined that that subcarrier is affected. If the entire available band is affected more than the threshold, it is determined that the interference is not only from the alien technology, and the method proceeds to stage 23. If it is determined that a part of the frequency band is affected by more than a predefined threshold, interference is detected and the method proceeds to stage 23.

In the paragraphs above, two examples have been illustrated using the CFR vector or the bit-allocation mapping. In practice, typically, the interference estimation may be based on the following parameter or combinations of parameters:

the channel frequency response (CFR) on its own;

CFR in combination with SNR, and optionally in combination with bit-allocation mapping or BER or another CRC or retransmission counter;

CFR in combination with bit-allocation mapping or BER or CRC or retransmission counter.

In stage 23, a recommendation is given to the service operator. This recommendation may be given upon request of a service operator in view of a complaint of a customer, but may also be given in the form of a potential alarm before the customer complains. The method of the invention may be performed continuously at a remote server for all home networks corresponding to a particular service operator, and the service operator may be updated continuously of any interference problems that are detected. The recommendations may then be used by the service operators for identifying alien devices or for determining how to reconfigure a device, and in particular for changing the frequency band to an unaffected location.

The reference data are stored in a database which is accessible by the remote server. The reference data may be stored definitively stored during a pre-configuration step, wherein a home network is measured whilst performing normally. According to an alternative embodiment, the reference data may be continuously updated by performing home network performance parameter measurements on all the network devices connected to the operator network.

Since most home network communication devices are TR-069 enabled devices, embodiments of the invention will typically not require any hardware modification at the end user's home network devices. Embodiments of the server of the invention may be implemented within the service operator's management centre and can be used as part of more sophisticated monitoring tools.

Whilst the principles of the invention have been set out above in connection with specific embodiments, it is to be understood that this description is merely made by way of example and not as a limitation of the scope of protection which is determined by the appended claims.

The invention claimed is:

1. A method for analysing a problem in a home network at a remote server, which is connected to the home network, via the internet, the method comprising:
storing reference data of at least one home network performance parameter covering a frequency band, the reference data corresponding to a normal behavior of the home network;
obtaining, via the internet, measurement data of the at least one home network performance parameter covering the frequency band;
comparing the measurement data with the reference data to determine qualification data qualifying the problem;
recommending a solution to the problem based on the qualification data; and
identifying a plurality of home communication devices operating in a plurality of frequency bands, the plurality of frequency bands including one or more overlapping bands, wherein
the reference data and the measurement data correspond to the at least one or more overlapping bands,
the qualification data is determined based on an affected frequency band of the measurement data in which the measurement data differs from the reference data by at least a desired threshold, and
the recommending a solution includes indicating at least one home communication device of the plurality of home communication devices as a device causing an interference problem based on the affected frequency band.

2. The method of claim 1, wherein the obtaining measurement data comprises:
using an application layer protocol for remote management to request and receive the measurement data.

3. The method of claim 2, wherein the application layer protocol for remote management is the TR-069 protocol.

4. The method of claim 1, wherein the at least one home network performance parameter includes a frequency dependent vector, the frequency dependent vector corresponding to at least one of a channel frequency response (CFR), a signal-to-noise ratio (SNR), a bit error rate (BER), a cyclic redundancy check (CRC), a retransmission counter, and a noise level.

5. The method of claim 1, wherein prior to an occurrence of the problem, obtaining the reference data by measuring the at least one home network performance parameter covering the frequency band.

6. The method of claim 1, wherein
the home network is connected to the internet via a home gateway device, and
the obtaining obtains the measurement data via the home gateway device.

7. A system for remotely analysing a problem in a home network, the system comprising:
a data storage configured to store reference data of at least one home network performance parameter covering a frequency band, the reference data corresponding to normal behavior of the home network;
a data collector configured to request and receive, via the internet, measurement data of the at least one home network performance parameter covering the frequency band;
a processor configured to execute computer-readable instructions to,
compare the measurement data with the reference data to determine qualification data qualifying the problem, and
recommend a solution to the problem based on the qualification data; and
a plurality of home communication devices configured to operate in a plurality of frequency bands, the plurality of frequency bands including one or more overlapping bands, wherein
the reference data corresponds to the one or more overlapping bands,
the data collector is further configured to request and receive the measurement data corresponding to the one or more overlapping bands, and
the processor is further configured to execute the computer-readable instructions to,
determine the qualification data based on an affected frequency band of the measurement data in which the measurement data differs from the reference data by at least a desired threshold, and
recommend the solution by indicating at least one home communication device of the plurality of home communication devices as a device causing an interference problem based on the affected frequency band.

8. The system of claim 7, wherein the data collector is a TR-069 enabled device, the TR-069 enable device configured to use an application layer protocol for remote management to request and receive the measurement data from a home gateway device or a device in the home network.

9. The system of claim 7, wherein the at least one home network performance parameter includes a frequency dependent vector, the frequency dependent vector corresponding to at least one of a channel frequency response (CFR), a signal-to-noise ratio (SNR), a bit error rate (BER), a cyclic redundancy check (CRC), a retransmission counter, and a noise level.

10. The system of claim 7, further comprising:
a home gateway device, which is a TR-069 enabled device, the home gateway device configured to,
receive a request for the measurement data of the at least one home network performance parameter,
obtain the measurement data of the at least one home network performance parameter, and
send the measurement data to the data collector via the internet,
wherein the data collector is connected to the home network via the internet and the home gateway device.

11. The system of claim 7, further comprising:
a plurality of home networks using at least one of G.hn standard, HomePlug, Urban Protected Area Network (UPA), and HomeGrid, each of the plurality of home networks including at least one of a coax line, a phone line, and a power line.

* * * * *